United States Patent [19]

O'Neill et al.

[11] 3,996,190

[45] Dec. 7, 1976

[54] FORMALDEHYDE FUME ABATEMENT IN THE PRODUCTION OF UREA/FORMALDEHYDE MOLDING RESINS

[75] Inventors: Charles T. O'Neill, Petersburg, Mich.; Edward L. Steiger, Toledo, Ohio

[73] Assignee: Allied Chemical Corporation, Morris Township, N.J.

[22] Filed: Sept. 15, 1975

[21] Appl. No.: 613,378

[52] U.S. Cl. .................. 260/39 R; 260/69 R;71
[51] Int. Cl.² ............................ C08G 12/12
[58] Field of Search ..................... 260/69 R, 71

[56] References Cited
UNITED STATES PATENTS

| | | | |
|---|---|---|---|
| 2,306,697 | 12/1942 | Hayward | 260/69 |
| 2,494,095 | 1/1950 | Hull | 260/71 |
| 2,652,377 | 9/1953 | Kise | 260/69 R |
| 2,669,551 | 2/1954 | Vaughan | 260/69 R X |
| 2,723,253 | 11/1955 | Wandell | 260/71 |
| 2,864,779 | 12/1958 | Bihan et al. | 260/71 |
| 2,872,425 | 2/1959 | Paz | 260/17.3 |
| 2,995,541 | 8/1961 | Kropa et al. | 260/77.5 |
| 2,999,847 | 9/1961 | Nemes et al. | 260/69 |
| 3,183,200 | 5/1965 | Hewson | 260/29.4 |
| 3,198,761 | 8/1965 | O'Donnell | 260/29.4 |
| 3,223,656 | 12/1965 | Frazier | 260/17.3 |
| 3,335,113 | 8/1967 | Dundon | 260/69 |
| 3,712,879 | 1/1973 | Strickrodt | 260/69 |
| 3,842,039 | 10/1974 | Vargiu et al. | 260/69 R |

OTHER PUBLICATIONS

N. M. Bikales, ed., Ency. of Polymer Technology, (1965), vol. 2, pp. 27-33.

*Primary Examiner*—Donald E. Czaja
*Assistant Examiner*—S. M. Person
*Attorney, Agent, or Firm*—Roger H. Criss; Michael S. Jarosz

[57] ABSTRACT

In the production of urea/formaldehyde molding resins, wherein urea and formaldehyde are reacted under alkaline conditions to form a liquid resinous composition, the composition is blended with a filler and the filled composition is dried, there is provided an improvement comprising reducing the level of formaldehyde fumes discharged to the atmosphere during drying by a process which comprises the steps of:

a. charging urea and formaldehyde to a reaction vessel in amounts to provide an initial mol ratio of formaldehyde to urea of about 1.0 to about 2.0 mols formaldehyde per mol of urea;

b. reacting the urea and formaldehyde in water at a temperature in the range of about 50° to 65° C. and at a pH of about 7.0 to about 9.0;

c. continuing the reaction until the mol ratio of formaldehyde to urea in the resin is at least about 75 percent of the initial mol ratio; and d. adding additional urea in an amount of about 0.5 to 10 percent by weight based upon the amount of urea initially charged; whereby the amount of formaldehyde discharged to the atmosphere is reduced.

15 Claims, No Drawings

FORMALDEHYDE FUME ABATEMENT IN THE PRODUCTION OF UREA/FORMALDEHYDE MOLDING RESINS

BACKGROUND OF THE INVENTION

1. Field of the Invention

This invention relates to a process for reducing formaldehyde exhaust fumes formed during the production of urea/formaldehyde molding resins.

2. Description of the Prior Art

Urea/formaldehyde molding resins are well-known in the art and exhibit excellent properties, including clarity, scratch- and mar-resistance, excellent electrical properties and excellent resistance to moisture, greases, oils and solvents. The molding compositions are easily handled by a molder and have excellent molding characteristics. Urea/formaldehyde molding resins have been used to produce numerous molded articles.

In general, these resins are prepared by a process which includes adding urea to a solution of formaldehyde in amount such that there is a molar excess of formaldehyde and carrying out the reaction at low temperatures (such as in the range of about 75° to 150° F.) and under slightly alkaline conditions (e.g., pH of 7 to 8.5). The reaction pH is usually maintained by the addition of buffer salts or organic amines. The initial reaction results in formation of methylol compounds which are the monomers for a subsequent resin condensation reaction. After several hours of reaction time, the resultant liquid resin is mixed with a filler to provide desired properties in the final cured product. Generally, cellulosic fillers are employed, such as alpha cellulose, which is a fibrous filler that serves to impart strength and moldability as well as reduce internal stresses during the curing of the resins. After the resin and the filler are thoroughly mixed, the resulting impregnated, pulpy, wet mass is dried by spreading the mass onto a continuous perforated conveyor belt which moves through an oven chamber wherein the moisture level is reduced to about 1 to 2 percent. At the end of the dryer, the material is in the form of a hard, caked mass which resembles a thick layer of popcorn and the popcorn sheet is cut and later combined with desired pigments, lubricants and catalysts. The resulting urea/formaldehyde molding compound is an intimately mixed, high bulk, fine powder.

During the drying operation, not only is water evaporated through the drying stacks, but formaldehyde is also found to be a component of the stack gases. The presence of formaldehyde is believed to result primarily from the excess amount employed during the initial mixing with urea to provide the requisite initial molar ratio which is required for the final molding compounds and which varies depending upon the desired properties of the final product.

It would be desirable to reduce the level of formaldehyde fumes discharged from the stacks to minimal amounts. Indeed, environmental agencies require that such fumes be abated to insignificant levels. Conventional approaches to existence of organic materials such as formaldehyde in the stack gases would suggest the utilization of a scrubbing unit. However, scrubbing equipment of such a nature is considerably expensive, and moreover, the reduction of formaldehyde fumes in the stack gases must be accomplished without adversely affecting the properties of the urea/formaldehyde molding compounds.

SUMMARY OF THE INVENTION

In accordance with this invention, in the production of urea/formaldehyde molding resins, wherein urea and formaldehyde are reacted under alkaline conditions to form a liquid resinous composition, the composition is blended with a filler and the filled composition is dried, there is provided an improvement comprising reducing the level of formaldehyde fumes discharged to the atmosphere during drying by a process which comprises the steps of:

a. charging urea and formaldehyde to a reaction vessel in amounts to provide an initial mol ratio of formaldehyde to urea of about 1.0 to about 2.0 mols formaldehyde per mol of urea;

b. reacting the urea and formaldehyde in water at a temperature in the range of about 50° to 65° C. and at a pH of about 7.0 to about 9.0;

c. continuing the reaction until the mol ratio of formaldehyde to urea in the resin is at least about 75 percent of the initial mol ratio; and d. adding additional urea in an amount of about 0.5 to 10 percent by weight based upon the amount of urea initially charged; whereby the amount of formaldehyde discharged to the atmosphere is reduced.

It has been found that the present process is capable of reducing the level of formaldehyde exhaust fumes in the stack gases by about 75 percent to a maximum level of about 0.0005 pounds formaldehyde per pound dry air.

The resulting liquid resinous compositions have excellent stability, with a stable life time of at least about two hours and often up to about six hours or more. Accordingly, such compositions are very much suitable for use in a commercial production of urea/formaldehyde molding compositions.

In addition, it has been found that in order to achieve maximum resin stability, the formaldehyde starting material should have a formic acid content in the range of about 0.03 to about 0.05 percent by weight. In order to maintain the desired alkaline conditions of about 7.0 to about 9.0 pH (preferably about 8.0 to about 8.5 pH), a buffering agent such as hexamethylenetetramine should be present in an amount of about 1.5 to about 5 percent by weight based upon the weight of the formaldehyde. This is in contrast to amounts in the range of about 0.5 percent of hexamethylenetetramine used with conventional, lower temperature reaction processes.

DESCRIPTION OF THE PREFERRED EMBODIMENTS

The process of this invention includes the utilization of standard mol ratios of urea/formaldehyde in the production of urea/formaldehyde molding resins. The amount of urea and formaldehyde charged to a reaction vessel ranges from about 1.0 to about 2.0 mols formaldehyde per mol urea, preferably 1.1 to 1.6 and most preferably, 1.3 to 1.5 mols formaldehyde per mol urea. Preferably, the formaldehyde employed is an aqueous solution known as formalin. Such aqueous solutions preferably contain from about 30 to about 60 weight percent of formaldehyde. As stated above, the formaldehyde should have a formic acid content in the range of about 0.03 to 0.05 percent by weight of formaldehyde. It has been found that if the formic acid content is below or above this range, the resin stability is adversely affected. The urea employed in the present process is preferably in the form of a dry powder, although solutions thereof could also be employed. As is typical in the production of urea/formaldehyde resins, the aqueous solution of formaldehyde and the dry urea powder are added to a mixing tank. Any suitable mixing tank may be employed for this purpose, such as those formed of stainless steel or other metals. In addition to charging of the aqueous formaldehyde solution and urea, there is also added to the mixing tank additional water which serves as the reaction medium together with a sufficient amount of an alkaline condensing agent to provide alkaline conditions during the condensation reaction. The preferred agent is hexamethylenetetramine; however, other alkaline materials may be employed such as ammonia, methylamine, ethylamine, ethylenediamine, amylamine, propylenediamine, phenylenediamine, triethanolamine and the like. When hexamethylenetetramine is employed, it should be present in an amount ranging from about 1.5 to 5 percent, preferably about 2 to 3 percent, based upon the weight of the formaldehyde.

Mixing is preferably continued until the urea is dissolved in the water and preferably the mixing is achieved at a temperature in the range of about 20° to 30° C., although higher temperatures can be employed. The total time for dissolving of the urea in the water may range from about 1 to 60 minutes, preferably about 1 to 10 minutes. Thereafter, the solution is heated to the reaction temperature. Preferably, in a commercial operation the solution is retained in the mixing tank and the reaction is carried out in such tank; alternatively, the solution may be charged to a separate reaction tank formed of suitable metal or other material. The pH of the solution before reaction temperatures are achieved is usually in the range of about 7.0 to about 9.0, more preferably in the range of about 8.0 to about 8.5.

The solution is heated to a reaction temperatures of about 50° to 65° C., preferably from about 55° to 60° C. The reaction continues at such temperature until the desired amount of formaldehyde is reacted with the urea. Typical reaction times range from about 0.5 to about 3 hours, preferably about 1 to 2 hours, depending upon the amount of charge, temperature and other factors. The pH of the solution during reaction ranges from about 7.0 to about 9.0, but is usually less than the original pH. Preferably, the pH during reaction is in the range of about 7.8 to about 8.2.

After the mol ratio of formaldehyde to urea is reduced to at least about 75 percent, preferably to at least about 85 percent, of the initial mol ratio, the additional amount of urea is charged to the reactor. This urea is preferably added as an aqueous solution but may alternatively be added as a dry powder. During the urea addition, the reaction solution is maintained at reactive temperatures. The amount of urea added ranges from about 0.5 to 10 percent by weight of the initial urea charged, preferably about 1 to 5 percent. The reaction is permitted to continue for an additional period of time such as in the range of about 0.5 to about 15 minutes, preferably from about 1 to about 10 minutes. The hot resin may thereafter be pumped to a holding tank for use in production of molding compounds.

It has been found necessary to retain the resin solution at temperatures in the range of about 50° to 65° C., preferably in the range of about 55° to 60° C. during storage of the resin.

The percent conversion of the reaction before the addition of a filler is at least about 75 percent, based upon the ratio of the initial mol ratio to the final mol ratio, and is preferably in the range of about 85 to 95 percent conversion. For example, for an initial charge of 1.5 mols of formaldehyde per mol of urea, the resin leaving the reaction tank may typically have a molar ratio of about 1.3 to 1.4 mols formaldehyde per mol urea. This resin solution has excellent stability (that is, remains clear) at the elevated reaction temperatures. For use in commercial production of urea/formaldehyde resins, resin stability must be at least about 2 hours. The resin solutions prepared in accordance with this invention are stable beyond that period and usually range from about 4 to 6 hours and above in stability. This is in contrast to a resin stability of slightly over 2 hours which is achieved when the reaction is conducted at lower temperatures for longer reaction times and without a second addition of urea.

The resin is thereafter blended with a filler in a conventional manner. A variety of fillers may be blended with the resin to provide the desired properties of the molding composition. Such fillers include, but are not limited to, cellulosic fillers such as alpha cellulose, glass fiber, wood flour, asbestos, cotton flock, chopped fabric and the like. As is standard in the production of urea/formaldehyde molding compounds, the resin is admixed with the filler in a shredder which serves to comminute the filler and homogeneously blend the filler with the resin. Additional additives are usually added to the resin-filler mix at this point. Such additives include conventional accelerators, lubricants, pH adjusting agents and the like. Typically, the pH of the wet mix ("pulp") ranges from about 5.5 to about 7.5.

The wet mix is thereafter dried; preferably, a continuous drying operation is employed wherein the pulp is discharged onto a continuous perforated conveyor belt which moves through an oven temperature where the moisture is reduced to a level of about 1% to about 2%. A feed drum may be employed to deposit a uniform level of the wet mass on the conveyor belt scrim. Temperatures employed in the oven are those usually employed in the drying of urea/formaldehyde molding compounds. For example, temperature in the oven may range from about 150° to about 250° F., preferably from about 170° to about 210° F.

As previously stated, during the drying operation free formaldehyde as well as water is evolved from the resin mix and is discharged from the dryer stacks. It has been found that the present process provides a significant reduction in the amount of formaldehyde fumes which are discharged from the stacks. Indeed, it has been found that such formaldehyde fume reduction is on the order of about 75% from the previously employed low temperature process, such that the total amount of formaldehyde leaving the stack is no greater than about 0.0005 pounds per pound of dry air.

The popcorn sheet which comes out of the dryer is thereafter further processed in a conventional manner. For example, the sheet is passed through a cutter and is then conveyed to storage bins for subsequent blending with conventional additives. These conventional additives would include binders, pigments, catalysts, and the like. Catalysts such as tetrachlorophthalic anhydride and the like may be employed in the blending operation. Additional amounts of such catalysts are usually required in view of the high alkaline content of the resin mix. After blending in an apparatus such as a ball mill, the material is ground and granulated to form an intimately mixed, high bulk, fine molding powder.

The following non-limiting examples set forth the best mode of carrying out the present invention. All parts and percentages are by weight unless otherwise indicated.

EXAMPLE 1

Urea formaldehyde molding compositions were prepared in accordance with this invention by charging 1500 parts urea, 2165 parts formalin (52% formaldehyde and a formic acid content of 0.03%), 27 parts hexamethylenetetramine and 160 parts of water to a stainless steel reactor. The initial mole ratio of formaldehyde to urea was 1.5 to 1.0. The initial pH was 8.1 to 8.3. The blend was heated to 55° C. (at atmospheric pressure) and the reaction was continued for 75 minutes at which time an additional 60 parts of urea were added. The reaction was continued for an additional 5 minutes after which the resin was transferred to a holding tank maintained at 55° C. The final mol ratio was 1.3 to 1.0, so that there were 0.2 mols formaldehyde unreacted. The final pH of the resin was 7.8 and the resin stability was between 4 to 6 hours. 946 Parts of the heated resin was blended in a shredder with 260 parts of bone dry alpha cellulose filler and conventional minor amounts of other additives including pH adjusters, accelerators, lubricants and the like, to provide a wet mix having a pH of 6.8. The wet mix was dried in a hot air oven for 90 minutes by depositing the mix onto a continuous scrim conveyor which moved through an oven maintained at a temperature of 190° to 210° C. The resultant popcorn sheet was comminuted in a conventional manner, blended in a ball mill with conventional additives, such as catalyst and pigment, and granulated. Parts were molded from the resin at a temperature of 300° F. and a pressure of 2000 psi with a cycle time of 1 to 2 minutes. Typical properties of the molded products are shown in Table 1.

EXAMPLE 2

Example 1 was repeated except that 6 parts of hexamethylenetetramine and 85 parts of water were initially charged, the formic acid content was 0.01 to 0.02%, the reaction temperature was 23° C., the reaction time was 4 hours and additional urea was not added. The final mol ratio of formaldehyde to urea was 1.0 to 1.0, meaning that 0.5 mols of formaldehyde were left unreacted. The resin was stable for 120 to 180 minutes at the reaction temperature. Thereafter, the resin was blended with filler, dried, blended with other additives (50% less catalyst was employed) and granulated as in Example 1. Products were molded from the molding composition as in Example 1 and typical properties are shown in Table 1.

Table 1

| Property | Example 1 | Example 2 |
|---|---|---|
| Arc resistance, sec | 118 | 118 |
| Dielectric strength, volts per mil — short time | 339 | 358 |
| — step-by-step | 295 | 307 |
| Flexural strength, psi | 13,231 | 11,811 |
| Initial shrinkage, in./in. | 0.0067 | 0.0050 |
| Additional shrinkage, in./in. | | |
| after 4 days at 170° F. | 0.0064 | 0.0063 |
| after 4 days at 100° F. | | |

Table 1-continued

| Property | Example 1 | Example 2 |
|---|---|---|
| 100% RH | 0.0100 | 0.0102 |

Comparing Examples 1 and 2, it can be seen that the process of this invention provides a resin composition having a stability of about 2 to 3 times longer than that produced by a low temperature reaction and reduced the level of unreacted formaldehyde by 60% (from 0.5 to 0.2 mols). The lowering of the formaldehyde content has a concommitant effect on the amount of formaldehyde discharged to the atmosphere by the drier stacks. For example, when employing a low temperature reaction and without a second urea addition, the amount of formaldehyde in the dried stack typically was 0.0025 pounds per pound dry air. In distinction thereto, following the process of this invention, the amount of formaldehyde in the drier stack typically is 0.00025 to 0.00047 pounds per pound dry air.

It is to be understood that variations and modifications of the present invention may be made without departing from the scope of the invention. It is also to be understood that the scope of the invention is not to be interpreted or limited to the specific embodiment disclosed herein but only in accordance with the appended claims when read in light of the foregoing disclosure.

We claim:
1. In the production of urea/formaldehyde molding resins, wherein urea and formaldehyde are reacted under alkaline conditions to form a liquid resinuous composition, the composition is blended with a filler and the filled composition is dried, the improvement comprising reducing the level of formaldehyde fumes discharged during drying by a process which comprises the steps of:
   a. charging urea and formaldehyde to a reaction vessel in amounts to provide an initial mol ratio of formaldehyde to urea of about 1.0 to 2.0 mols formaldehyde per mol urea;
   b. reacting the urea and formaldehyde in water at a temperature in the range of about 50° to 65° C. and at a pH of about 7.0 to 9.0;
   c. continuing the reaction until the mol ratio of formaldehyde to urea in the resin is at least about 75% of the initial mol ratio; and
   d. adding additional urea in an amount of from about 0.5 to 10 percent by weight based upon the amount of urea initially charged; whereby the amount of formaldehyde discharged to the atmosphere during drying is reduced.

2. The process of claim 1 wherein said initial mol ratio is from about 1.1 to 1.6 mols formaldehyde per mol urea.

3. The process of claim 2 wherein said initial mol ratio is from about 1.3 to about 1.5 mols formaldehyde per mol urea.

4. The process of claim 1 wherein said reaction is continued until said mol ratio in the resin is at least about 85 percent of said initial mol ratio.

5. The process of claim 1 wherein the formaldehyde charged to said reaction vessel contains from about 0.03 to about 0.05 percent by weight formic acid.

6. The process of claim 1 wherein hexamethylenetetramine is charged to said reaction vessel in an amount ranging from about 1.5 to 5 percent by weight based on the weight of formaldehyde.

7. The process of claim 6 wherein said hexamethylenetetramine ranges from about 2 to 3 percent by weight based on the weight of formaldehyde.

8. The process of claim 1 wherein said reaction temperature is in the range of about 55° to 60° C.

9. The process of claim 1 wherein the pH during said reaction is in the range of about 7.8 to 8.2.

10. The process of claim 1 wherein the resulting resin solution is maintained at a temperature in the range of about 50° to 65° C. prior to drying.

11. The process of claim 1 wherein the amount of formaldehyde discharged to the atmosphere is less than about 0.0005 pounds per pound dry air discharged.

12. In a process for producing urea/formaldehyde molding resins, the improvement comprising
 a. reacting from about 1.4–1.6 mols of formaldehyde with one mol of urea in water at a temperature in the range of about 50° to 65° C. and at a pH in the range of about 7.8 to 8.2;
 b. continuing said reactions until the mol ratio of formaldehyde to urea in the resin is in the range of about 1.2 to 1.5;
 c. adding additional urea in an amount of from 0.5 to 10% by weight, based on the weight of the initial urea, while maintaining a temperature in said range;
 d. blending the resulting resin with a filler to produce a wet mass;
 e. drying said wet mass; and
 f. comminuting the dried product; whereby the amount of formaldehyde discharged through in stack gases associated with said drying is less than about 0.0005 pounds per pound dry air.

13. The process of claim 12 wherein said formaldehyde has a formic acid content of about 0.03 to 0.05 percent by weight.

14. The process of claim 13 wherein from about 1.5 to 5 percent by weight of hexamethylenetetramine, based on the weight of formaldehyde, is present during the reaction.

15. The process of claim 14 wherein the reaction time is in the range of about 1 to 2 hours.

* * * * *